US005661648A

United States Patent [19]

Georgitsis et al.

[11] Patent Number: 5,661,648

[45] Date of Patent: Aug. 26, 1997

[54] CONTROL SYSTEM FOR A BOOK-BINDING MACHINE

[75] Inventors: Nikolaos Georgitsis, Lubbecke; Uwe Trox, Stemwede/Wehdem, both of Germany

[73] Assignee: Kolbus GmbH & Co. KG, Rahden, Germany

[21] Appl. No.: 569,720

[22] Filed: Dec. 8, 1995

[30] Foreign Application Priority Data

Dec. 9, 1994 [DE] Germany .......................... 44 34 900.8

[51] Int. Cl.[6] .................................................. G06F 19/00

[52] U.S. Cl. ...................... 364/181; 364/188; 364/468.24

[58] Field of Search .................................... 364/140, 141, 364/146, 147, 188, 189, 191, 192, 193, 180, 181, 160, 468.01, 468.24; 412/11–14

[56] References Cited

U.S. PATENT DOCUMENTS

| | | | |
|---|---|---|---|
| 3,896,871 | 7/1975 | Pecoraro et al. | 364/181 X |
| 4,141,065 | 2/1979 | Sumi et al. | 364/181 |
| 4,533,990 | 8/1985 | Takada et al. | 364/181 X |
| 4,561,061 | 12/1985 | Sakamoto | 364/550 |
| 4,669,042 | 5/1987 | Henderson et al. | 364/181 |

FOREIGN PATENT DOCUMENTS

| | | |
|---|---|---|
| 31 11 264 A1 | 4/1982 | Germany . |
| 37 17 904 C2 | 12/1988 | Germany . |
| 677 465 A5 | 5/1991 | Switzerland . |

*Primary Examiner*—Joseph Ruggiero
*Attorney, Agent, or Firm*—Chilton, Alix & Van Kirk

[57] ABSTRACT

An improved computer-automated control system for a book-binding machine which provides for emergency manual control of the binding machine in the event of failure of the computer-controlled portion of the control system. The improvement includes a manually operated control instrument and a plurality of switchable coupling components associated with the adjusting devices of a book-binding machine. Each of the switchable coupling components is electrically coupled to an associated adjusting device and the computer-automated portion of the control system and is capable of being electrically coupled to the control instrument. Upon coupling of the control instrument to the switchable coupling component, control of the associated adjusting device is switched from the computer-controlled portion of the control system to the control instrument.

8 Claims, 1 Drawing Sheet

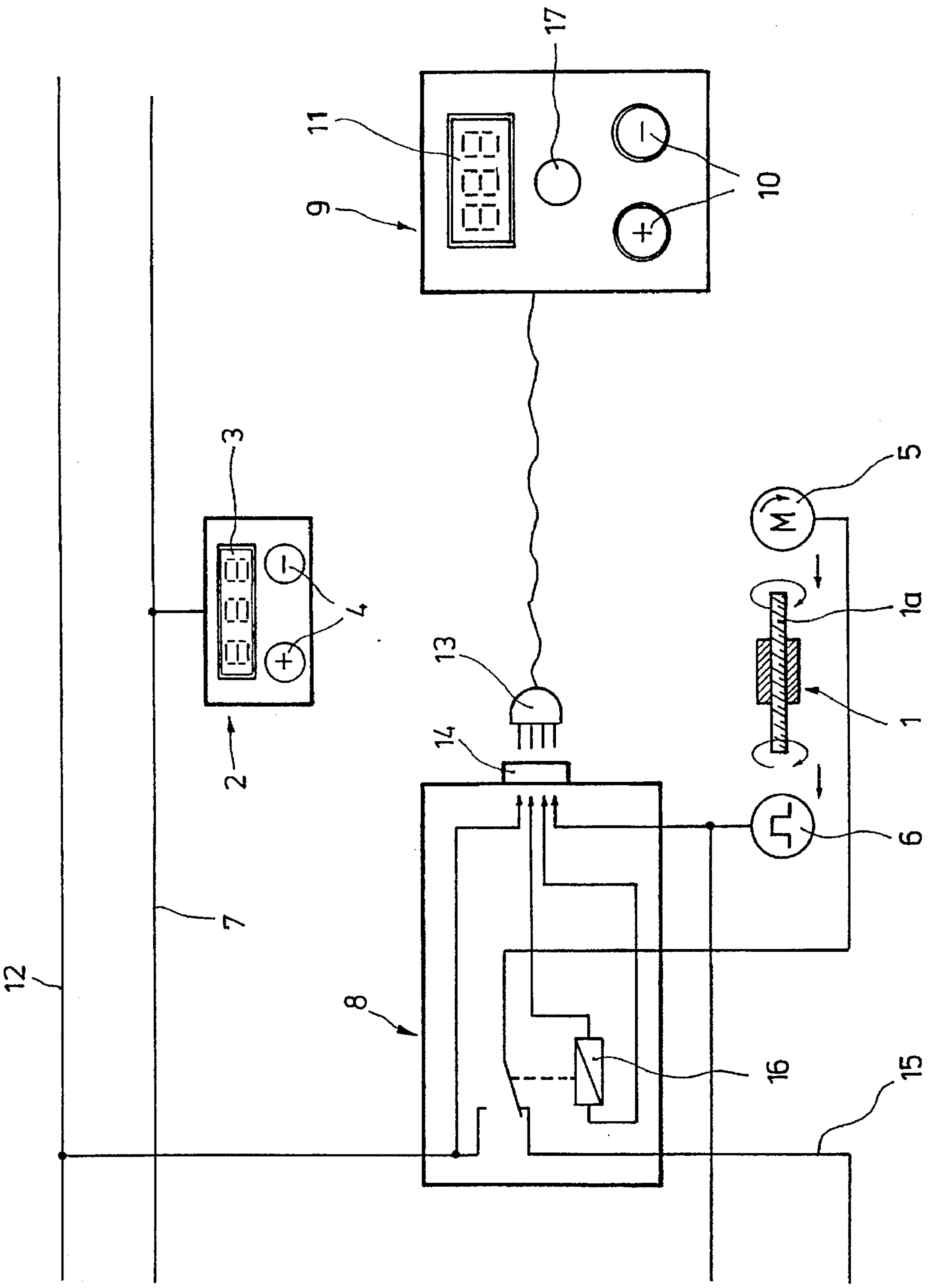
17
11
9
10
3
2
4
5
M
1a
1
13
14
6
7
12
8
16
15

CONTROL SYSTEM FOR A BOOK-BINDING MACHINE

BACKGROUND OF THE INVENTION

1. Field of the Invention

The present invention relates to controlling industrial machinery and, particularly, to setting and controlling apparatus used in bookbinding operations. More specifically, the present invention relates to an improved control system for machinery employed in a bookbinding procedure, the improvement enabling the exercise of control over the machinery in the event of failure of the computer-automated portion of the control system. Accordingly, the general objects of the present invention are to provide novel and improved methods and apparatus of such character.

2. Description of the Related Art

In recent years, the printing industry has become increasingly dependent on computer-automated control systems for performing a wide variety of functions. One area within the printing industry where computer automation has been successfully utilized is in the controlling of book-binding machinery, For example, computer-based control systems are presently used to store binding machine settings obtained from a lengthy and complex preliminary set-up procedure. With such a control system, once the machine settings have been stored in a computer they can be quickly recalled to assist machine set-up for future operations on books having the same format. By resetting a binding machine according to previously stored format settings, unnecessary duplication of effort can be avoided. Thus, through the use of computer-control, binding machine control systems have dramatically reduced preliminary set-up time and the operation of these machines has been greatly simplified. Consequently, computer-automation of this nature has yielded a reduction in the overall cost of book-binding operations.

Presently, a typical computer-controlled book assembly line generally consists of a plurality of functional stations having components which can be precisely positioned with electromechanical adjusting devices and some form of computer-based control system for controlling the adjusting devices. Each of the adjusting devices includes at least one actuating element for imparting motion to the component to be positioned, and at least one position measuring sensor for detecting the position of the adjusting device. The actuating elements of such adjusting devices typically comprise servo-motors which are operably associated with adjusting spindles for either clockwise or counter-clockwise rotation. Each servo-motor will impart motion to an associated machine component via an adjusting spindle in response to control signals received from the control system. The position sensors directly or indirectly sense the location of the adjusting devices and transmit positional information to the computer for processing and/or storage.

Typically, the control system for a machine employed in a book-binding operation will include a centralized control device and a plurality of local control devices. The centralized control device consists of an operator/system interface, such as a personal computer with a key board and a monitor, and a machine control system, such as an SPS control system. The machine control system is connected between the computer and the adjusting devices for converting digital information received from the computer into currents which will drive the adjusting devices in the appropriate direction. Settings for a given format may be inputted by an operator at a local control device and/or at the computer, and implemented at the adjusting devices via the SPS machine control system.

The type of control system being described, as mentioned above, also customarily has a local control device associated with each adjusting device, the local control devices being connected to the computer via a data bus. These local control devices each typically include an input device to enable an operator to input or change format settings and a display to allow the monitoring of position information from the functional station of the binding machine. Format settings inputted at the local control device are transmitted to, and stored at, the computer of the centralized control device. Alternatively, the computer can receive the settings from the position sensors. The book-binding machine can thus be manually set-up using the local control devices and the position of the components controlled by the adjusting devices will be detected by the position sensors for transmission to the computer.

As noted above, the use of the known recently developed computer-automated control systems has greatly simplified book manufacturing operations. Prior to the use of computer-automated control systems for controlling book-binding machines, preliminary set-up of each functional station of a binding machine was implemented manually. This invariably entailed a lengthy process often involving a substantial amount of trial and error. Most importantly, once a binding machine was reset in preparation of a subsequent binding operation, the time and labor expended to achieve the previous format setting could not be saved for future use. Thus, significant additional expense would have to be incurred to duplicate the previous format settings if needed at a future time. The use of computer-based control systems of the type described above, however, allows laboriously obtained format settings to be stored and quickly recalled to automatically implement repositioning of the adjusting devices. Since settings for a large number of formats can be stored in the computer and repeatedly recalled, substantial time and labor savings can be achieved. Thus, the benefits of automating binding-machine operations include simplified binding machine operation, minimization of binding machine set-up time, and overall cost reduction.

Previously available binding machine automated control systems can create considerable interference with normal book-binding operations in the event of control system failure. For example, employing previously available control systems, appropriate movement of the adjusting devices, and hence movement of the binding machine components, is wholly dependent on proper operation of the control system, i.e., failure of virtually any part of the control system could prevent performance of some vital function. Thus, there has existed a need in the art for an improved control system for use with a book-binding machine which enables an operator to override the computer-based control system and also to utilize alternative means to selectively control individual adjusting devices of the binding machine in the event of failure of the computer-based control system.

SUMMARY OF THE INVENTION

It is, accordingly, an object of the present invention to provide an improved control system for a look-binding machine which enables an operator to control the adjusting devices of a binding machine even in the event of failure of the computer-based portion of the control system.

The foregoing and other objects and advantages of the present invention are provided by modifying a computer-automated control system of the type generally described above to include a manually operated control instrument and a plurality of switchable coupling components, wherein each of the coupling components is associated with one of the adjusting devices of a binding machine. The control instrument, which has an input device for inputting settings and a display for monitoring control system information, is capable of receiving data from and supplying drive current to an adjusting device independently of the computer-based portion of the control system. Each of these switchable coupling components is electrically connected to both an associated adjusting device and a centralized control system. Each coupling component is also capable of interfacing with the control instrument. Connection of the control instrument to the switchable coupling component causes the actuating element of the adjusting device to be electrically isolated from the centralized control device and selectively electrically connected to a supplemental, i.e., emergency, power supply in a manner determined by the control instrument: Thus, in the event of a control system failure, an operator may use the control instrument as an alternative operator/ system interface to control an adjusting device completely independently of the computer based portion of the control system.

BRIEF DESCRIPTION OF THE DRAWING

The drawing comprises a schematic diagram of a representative portion of an improved control system in accordance with the present invention, the control system being depicted in combination with a single adjusting device of a binding machine.

DESCRIPTION OF THE DISCLOSED EMBODIMENT

With reference to the drawing, a portion of an improved control system in accordance with the present invention is shown as connected for exercising control over an adjusting device indicated generally at 1. The disclosed portion of the control system includes a single local control device 2, a single switchable coupling component 8 and a control instrument 9. It will be readily appreciated by those of ordinary skill in the art that a complete control system in accordance with the present invention would typically include a plurality of local control devices, a plurality of switchable coupling components, at least one control instrument and, of course, the centralized control system, not shown, which includes the computer and associated machine control. In a complete control system of this nature each of the components would be substantially similar to those shown and described herein. Additionally, each of the coupling components, hereinafter "couplers", would be connected to one of a plurality of adjusting devices in a manner substantially similar to that shown and described herein.

The portion of the control system depicted in FIG. 1 includes elements of a previously available computer-automated control system of the type described in the background portion of the specification. Local control device 2 is thus substantially similar to the abovedescribed local control devices. The centralized control device of this computer-automated control system, while not depicted in the drawing, is connected to the present invention via control line 15. As described above, local control device 2 has a display 3, for local viewing of positional information, and an input device 4, i.e., command switches, for incrementing the position of adjusting device 1. Position change command data is transmitted from local control device 2 to the centralized control device via data bus 7 for storage and/or control of adjusting device 1. Under normal operation, the centralized control device processes position data originating from local control device 2 to generate a control signal of the appropriate polarity or phase to induce movement of adjusting device 1 in the desired direction. The power supply/control signal from the centralized control device is delivered to actuating element 5 of adjusting device 1 via supply line 15, a coupler 8 and a continuation of supply line 15 which extends from coupler 8 to element 5. While schematically depicted in the drawing as a single conductor, supply line 15 will be a multi-conductor electrical cable capable of supplying a reversible polarity direct current or a multi-phase alternating current for driving actuating element 5 in the desired direction. The centralized control device is also electrically connected to a position sensor 6, which is operatively connected to adjusting device 1, by a data bus. Actuating element 5, which is typically a servo-motor, is connected to one end of a spindle 1*a* which is, in turn, connected to an adjustable position working component of a binding machine. The output shaft of motor 5 will rotate in a direction commensurate with control information appearing on supply line 15 and sensor 6 will simultaneously provide feedback information commensurate with the position of adjusting device 1. The position information will be processed and may be displayed at local control device 2 and/or on the monitor of the centralized control device.

The novel portion of the control system of the invention includes the addition of a control instrument 9 and the couplers 8, Control instrument 9, which is capable of generating control signals for a switching device 16 of coupler 8, has an input device 10 for inputting position change commands and a display 11 for local monitoring of position information for the actuating device being controlled. Preferably, control instrument 9 is a hand-held unit which can be electrically connected to coupler 8 via a multi-conductor cable and cooperating male and female connectors 13,14. Control instrument 9 could be powered by batteries contained therein, but preferrably receives power from a supplemental, i.e, back-up, power supply via a supply line 12, coupler 8 and the connecting cable, Under normal operation, switching device 16 of coupler 8 causes establishment of an electrical circuit between supply line 15 and actuating device 1. Thus, adjusting device 1 is normally controlled by the computer-based portion of the control system in a manner similar to that described in the background portion of the specification, In the event of failure of the computer-based portion of the control system, however, control instrument 9 will be plugged into coupler 8 by physically connecting connector 13 on the cable from control instrument 9 to complementary plug 14 of the coupler. Under these conditions, control instrument 9 can cooperate with adjusting device 1 in generally the same manner as the computer-controlled portion of the system cooperates with adjusting device 1 under normal operation.

In the operating of the present invention, control of adjusting device 1 is automatically transferred from the centralized control device to control instrument 9 upon physically connecting plugs 13 and 14. When this occurs, electrical power is supplied to control instrument 9 from supply line 12, control instrument 9 is automatically turned on and switching device 16 interrupts the circuit between supply line 15 and motor 5. Thus, the interconnecting of plugs 13 and 14 causes switching device 16 to electrically isolate supply line 15 from the adjusting device 1. Thereafter, control voltages of the appropriate polarity or phase for repositioning spindle 1*a* are derived from the power supply connected to supply line 12, and delivered to motor 5, under the control of switching device 16 of coupler 8. The state of switching device 16, i.e., the "contacts" of the device which are at any instant open or closed, is determined by control signals which originate from control instrument 9. Thus, implementation of the appropriate electrical connections between power supply bus 12 and motor 5 by switching device 16 occurs in response to selection of the "up" or "down" key of the input device 10 of control instrument 9. Considering a direct current motor 5, in order to rotate spindle 1*a* in one direction, switching device 16 connects a pair of conductors extending from bus 15 to the motor with one polarity. In order to rotate spindle 1*a* in the opposite direction, switching device 16 reverses the polarity of these power supply conductors. Obviously, the back-up or emergency power supply bus 15 is preferably a multi-conductor electrical cable similar to supply line 15 as described above. Plugs 13 and 14 also electrically couple control instrument 9 to the data bus which carries the position information generated by sensor 6. This coupling enables control instrument 9 to receive positional information from sensor 6 for viewing on display 11 of control instrument 9. Since sensor 6 preferably transmits digital information, discrete incremental movement of adjusting device 1 can be displayed and implemented, for example, in steps of 1/10 mm. However, since adjusting device 1 could be in any position when electrical coupling between control instrument 9 and adjusting device 1 via coupler 8 commences, the absolute position of adjusting device 1 cannot be determined. Thus, the initial position of adjusting device 1 normally registers on display device 11 as a zero value. Consequently, any movement of the adjusting device 1 from the initial position will be detected by sensor 6 and will register on display 11 as the difference between the current position and the initial position. However, the system can be recalibrated by using control instrument 9 to move adjusting device 1 to a predetermined mechanical zero point and by operating a reset button 17 on control instrument 9. After this recalibration procedure, display 11 will subsequently indicate the absolute position of adjusting device 1.

While a preferred embodiment of the present invention has been illustrated and described in detail, it will be readily appreciated by those of ordinary skill in the art that many modifications and changes thereto are possible. Therefore, it should be understood that the appended claims are intended to cover any and all of such modifications and changes which fall within the spirit and scope of the invention.

What is claimed is:

1. An improved control system for a book-binding machine having a plurality of functional stations with associated adjusting devices, the adjusting devices being capable of being controlled by a centralized control, the centralized control normally being electrically connected to the adjusting devices for receiving data from and/or supplying position commands to the adjusting devices, said improved control system comprising:

a supplemental power supply;

at least one manually operated control instrument for generating and transmitting position control signals, said control instrument having an input device for manually inputting adjusting device position change commands, said control signals being generated by said control instrument in response to said commands; and a plurality of coupler means for selectively establishing electrical connections between associated adjusting devices and either the centralized control or said supplemental power supply, each of said coupler means having connector means for establishing electrical communication between said control instrument and said coupler means, each of said coupler means further including switching means which operates in response to said position control signals to establish an electrical connection between said supplemental power supply and the associated adjusting device which is commensurate with a commanded position change.

2. The apparatus of claim 1 wherein position sensors are associated with the adjusting devices, said control instrument includes a display device for position information, and wherein said coupler means switching means further establishes a data transmission path between said control instrument and the position sensor of the associated adjusting device.

3. The apparatus of claim 2 wherein said control instrument further includes means for resetting said display device.

4. The apparatus of claim 1 wherein said supplemental power supply is a source of direct current.

5. The apparatus of claim 1 wherein said supplemental power supply is a multiphase alternating current source.

6. The apparatus of claim 1 wherein said coupler means switching means includes normally closed contacts for connecting the adjusting device to the centralized control, said normally closed contacts being opened by said switching means to isolate the adjusting device from the centralized control upon establishment of communication between said coupler means and said control instrument.

7. The apparatus of claim 6 wherein position sensors are associated with the adjusting devices, said control instrument includes a display device for position information, and wherein said coupler means switching means further establishes a data transmission path between said control instrument and the position sensor of the associated adjusting device.

8. The apparatus of claim 7 wherein said control instrument further includes means for resetting said display device.

* * * * *